(12) United States Patent
Hayes et al.

(10) Patent No.: US 9,338,212 B2
(45) Date of Patent: May 10, 2016

(54) MULTI-INTERFACE ADAPTIVE BIT RATE SESSION MANAGEMENT

(71) Applicant: CISCO TECHNOLOGY, INC., San Jose, CA (US)

(72) Inventors: Richard C. Hayes, Raleigh, NC (US); Kevin Shatzkamer, Hingham, MA (US); Mark Grayson, Maidenhead (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 14/683,158

(22) Filed: Apr. 10, 2015

(65) Prior Publication Data

US 2015/0215367 A1    Jul. 30, 2015

Related U.S. Application Data

(63) Continuation of application No. 13/408,476, filed on Feb. 29, 2012, now Pat. No. 9,014,027.

(51) Int. Cl.

| | | |
|---|---|---|
| *H04L 12/28* | (2006.01) | |
| *H04L 29/06* | (2006.01) | |
| *H04W 76/02* | (2009.01) | |
| *H04W 28/02* | (2009.01) | |
| *H04W 4/18* | (2009.01) | |
| *H04W 88/06* | (2009.01) | |
| *H04L 12/70* | (2013.01) | |
| *H04W 28/06* | (2009.01) | |

(52) U.S. Cl.
CPC ............ *H04L 65/80* (2013.01); *H04L 65/1066* (2013.01); *H04W 4/18* (2013.01); *H04W 28/0215* (2013.01); *H04W 28/0231* (2013.01); *H04W 76/026* (2013.01); *H04L 2012/5678* (2013.01); *H04W 28/06* (2013.01); *H04W 88/06* (2013.01)

(58) Field of Classification Search
CPC ................... H04L 2012/5678; H04L 65/1066; H04L 65/80; H04W 28/0215; H04W 28/0231; H04W 28/06; H04W 4/18; H04W 76/026; H04W 88/06
USPC ......... 370/252, 235, 389–391, 312, 467–468; 725/90, 109, 112; 709/231–232
See application file for complete search history.

(56) References Cited

U.S. PATENT DOCUMENTS

| | | |
|---|---|---|
| 5,412,375 A | 5/1995 | Wood |
| 5,796,727 A | 8/1998 | Harrison et al. |

(Continued)

*Primary Examiner* — Mohamed Kamara
(74) *Attorney, Agent, or Firm* — Patent Capital Group

(57) ABSTRACT

Systems and method are provided that allow an application layer client in a mobile device to manage multiple interfaces in a communication network. The multiple interfaces can include WiFi, cellular, Femto, WiMAX, Bluetooth, infrared, Ethernet, and other types of interfaces for communication in a network. The client on the mobile device can use intelligence and rules to determine how and when request fragments are communicated over the various interfaces available to the client. The intelligence can include parameters such as performance information for a particular interface and subscriber preferences. Based on this information the client can decide to use a combination of the interfaces to obtain multimedia content and render the content for display on the mobile device. By using a combination of interfaces and tracking the advantages and disadvantages of each interface, the client can make intelligent decisions in providing multimedia content to the user.

20 Claims, 10 Drawing Sheets

(56) References Cited

U.S. PATENT DOCUMENTS

| | | |
|---|---|---|
| 7,987,285 B2 | 7/2011 | Melnyk et al. |
| 8,516,144 B2 * | 8/2013 | Hsu .................... H04N 21/4381 709/231 |
| 9,014,027 B2 | 4/2015 | Hayes et al. |
| 2010/0202397 A1 | 8/2010 | Chari et al. |
| 2011/0128961 A1 | 6/2011 | Brooks et al. |
| 2011/0255594 A1 | 10/2011 | Nagori et al. |
| 2013/0007297 A1 * | 1/2013 | Soroushian ......... H04L 65/4084 709/231 |
| 2013/0061040 A1 * | 3/2013 | Kiefer ................... H04L 9/0819 713/155 |
| 2013/0089033 A1 * | 4/2013 | Kahn ................... H04W 28/22 370/329 |
| 2014/0020036 A1 | 1/2014 | Hasek et al. |

* cited by examiner

MULTI-INTERFACE ADAPTIVE BIT RATE SESSION MANAGEMENT

RELATED APPLICATION

This Application is a continuation (and claims the benefit of priority under 35 U.S.C. §120) of U.S. application Ser. No. 13/408,476, filed Feb. 29, 2012, entitled "MULTI-INTERFACE ADAPTIVE BIT RATE SESSION MANAGEMENT," Inventors Richard C. Hayes, et al. The disclosure of the prior application is considered part of (and is incorporated by reference in) the disclosure of this application.

FIELD OF THE DISCLOSURE

This disclosure relates generally to managing media protocol requests and media delivery across multiple network interfaces and the corresponding communication networks.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology.

Mobile subscribers increasingly use applications to experience media, such as watching video and listening to audio. These applications use media protocols to stream media from media servers to clients, such as programs running on personal computers or mobile devices. Example media protocols include adaptive bit rate (ABR), real time streaming protocol (RTSP), and real-time transport protocol (RTP). These protocols are designed to work efficiently over large and distributed networks such as the Internet. The demand for media over wireless networks is not expected to slow, especially as mobile devices become more sophisticated and as users become more dependent on mobile devices.

DESCRIPTION OF EXAMPLE EMBODIMENTS

Overview

Figure 1:
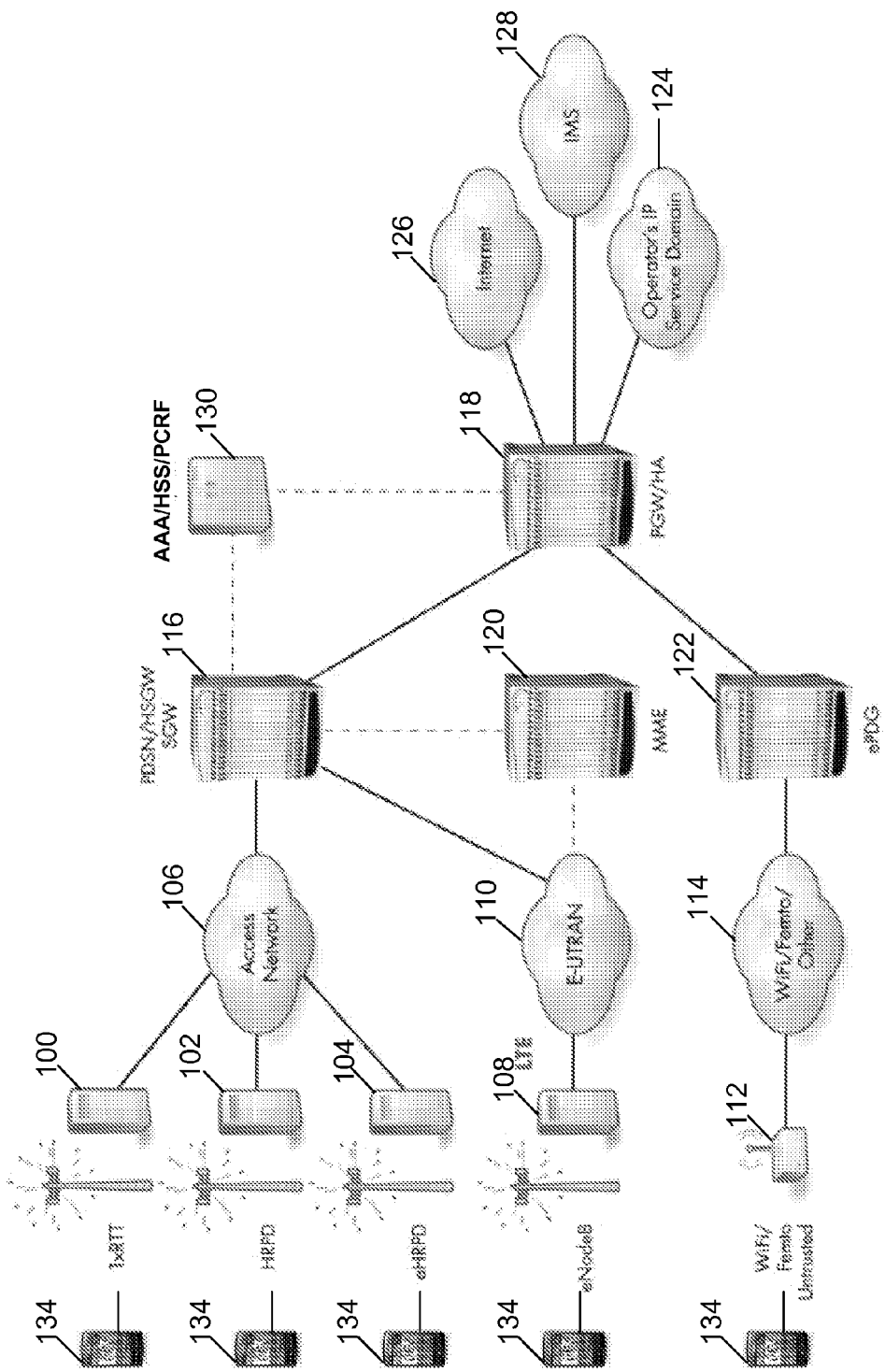
FIG. 1 illustrates a communication network for multiple-interface media protocol session management including long term evolution (LTE), code division multiple access (CDMA), and WiFi topologies in accordance with certain embodiments.

Certain embodiments disclose a method including receiving a request for media content at an adaptive bitrate (ABR) client, fragmenting the request for media content into a plurality of ABR fragment requests for the media content, managing a plurality of interfaces for communicating the plurality of ABR fragment requests at the ABR client, determining at the ABR client which interface to send specific ABR requests over using parameters available to the ABR client including performance information for the plurality of interfaces and subscriber preference information, and sending the plurality of ABR fragment requests for the media content across both a first interface and a second interface of the plurality of interfaces.

Example Embodiments

This disclosure generally relates to requesting media content over a variety of interfaces and requesting media content from more than one interface at a time. Multimedia data is responsible for a growing percentage of data traffic over communication networks. Multimedia tends to consume large amounts of data and threatens to consume even greater percentages of bandwidth as screen resolution increases on mobile devices and wireless networks become more capable. As the consumer use model and corresponding video consumption evolves into an increasingly mobile experience, the mobile devices and media protocol clients can be enhanced to permit use of multiple interfaces to obtain content from multiple technologies or even parallel networks. This can provide more robust performance and a better user experience, while also aiding in the management of traditional wireless carrier networks helping those carriers from a monetization perspective.

Internet applications and services rely on a set of specific media protocols to communicate video and audio multimedia over a network. As one example of communications using media protocols, a user may visit a web site offering video content using a mobile device. When the user chooses a video to view, a program running on the mobile device contacts a video server on the Internet to request video content using the media protocol. The video server sends the requested video content to the mobile device using media protocols. How the video content is requested, delivered, and displayed depends on the specifics of the media protocol employed. A client running on the mobile device can specify the media protocol used in retrieving the video content.

Adaptive bit rate (ABR) is one example of a media-aware technique for delivering video utilizing common web protocols. ABR streaming switches dynamically among media files of differing bit rates, or overall quality and size, to allow for a smooth viewing or listening experience for the user. Adaptive bit rate technologies for video are typically dependent on a client program running on the user device capable of monitoring video performance, building dynamic empirical results from this monitoring, and requesting specific media fragments from a stateless video server based on these results. ABR utilizes HTTP protocol (a stateless connection) and independent, temporally segmented media fragments. This allows the client to acquire segments independently, nonlinearly, and on-demand. These characteristics provide certain performance enhancements such as rapid start-up playback. The design of ABR is to provide high quality of experience playback to users by automatically adapting to dynamic and changing conditions of the network and/or mobile device. Generally, ABR is designed to select the highest bit rate for media to improve the quality of the media streamed to the client. However, the higher the bit rate or quality of the media streamed over the network, the higher the amount of network resources used (e.g., bandwidth) and associated costs.

Network operators can address the rapid increase in network resource usage and media traffic by increasing network capacity. One way to increase the network capacity is by deploying parallel communication networks using dissimilar radio technology. For example, a network operator can deploy both a cellular communication network and a wireless local area network (WLAN) in a single region, so that a portion of the data traffic is serviced through a cellular communication network and the rest of the data traffic is serviced through a WLAN. In some cases, a network operator can leverage a WLAN that is operated by a third-party. If a WLAN is already deployed in a certain area, the network operator can offload data traffic from the cellular network to the WLAN. In another example, a network operator can deploy two parallel cellular networks but using two different technologies. For instance, the network operator may deploy a Long Term Evolution (LTE)-based cellular network that provides islands of hot spot coverage within a wide area Code Division Multiple Access (CDMA) 2000-based cellular network.

A client may connect to parallel communication networks using multiple network interfaces. For example, a client may access the Internet concurrently using a cellular network interface, a wired Ethernet network interface, and a Wi-Fi wireless network interface. Or, a client may access multiple networks using a single network interface. For example, a client may use a Wi-Fi wireless network interface to access parallel wireless network using a Wi-Fi SSID (service set identifiers). The same wireless network interface can include one or more logical adaptors, where each logical adaptor corresponds to a specific SSID. In some embodiments, the client uses multiple logical adaptors at the same time to communicate over parallel wireless networks.

ABR clients exist in the application layer and do not have visibility into network interfaces, and are defined to use a single interface. Generally, interfaces are managed on the transport or network layers of the OSI model. ABR clients generally request media fragments sequentially using the single network interface. ABR clients generally request the next media fragment, utilizing a buffer, as the ABR client approaches the end of the currently playing fragment, to provide a seamless experience to the user. However, ABR servers are stateless, implying that an ABR client may request a media fragment representing any valid time in a media stream, and encoded at any available bit rate. When multiple active network interfaces are available to an ABR client, the design of ABR clients does not utilize these multiple network interfaces. An enhanced ABR client can manage ABR sessions using multiple network interfaces. In particular, the disclosed systems and methods use network load information, such as availability, performance, association, and cost, so that ABR clients can request and receive media fragments more efficiently, resulting in an improved media experience for the user and/or more effective use of resources. The ABR client can make the application layer decisions in managing more than one interface.

This enhanced multi-interface ABR client can enable a seamless viewing experience for user equipment by employing the ability to gather data for a common rendering from multiple network paths. The enhanced ABR client enables a service provider to perform network analytics on a subscriber accessing ABR videos over a WiFi network, even though the service provider does not carry the entire fragment sequence because multiple interfaces are used. This ABR client also provides a more-optimized mechanism to deliver ABR content to a device with multiple interfaces available. The ABR client also provides to the end user a more robust way to control usage fees on macro cellular networks employing usage fee pricing models.

FIG. 1 illustrates a communication system for multiple-interface media protocol session management including a long term evolution (LTE) topology in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as Wireless Local Area Network (i.e., Wi-Fi), Femto, WiMAX, or any other radio spectrum technology, can use a transceiver shown generally at 112 to connect a user equipment (UE) 134 to the network using a broadband or other access network. The UE can include any mobile device such as a laptop, a smartphone, or a tablet computer.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, such as a packet data network gateway (PGW), and a mobility management entity (MME) 120. On the access network side, the anchor gateway 118 can also communicate with an evolved packet data gateway (ePDG) 122 that provides connectivity to the WLAN/Femto/other transceiver 112. On the packet core side, the anchor gateway can communicate with the operator's IP service domain 124, the Internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 134 is detached from the network, the HSS 130 maintains the binding information until the UE 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS/PCRF 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or network device as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-access stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed untrusted non-3GPP access technologies such as a WLAN, WiMAX, LTE metro, and femtocell access networks. The ePDG 122 can use IPSec/IKEv2 to provide secure access to the EPC network. Optionally, the ePDG 122 can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
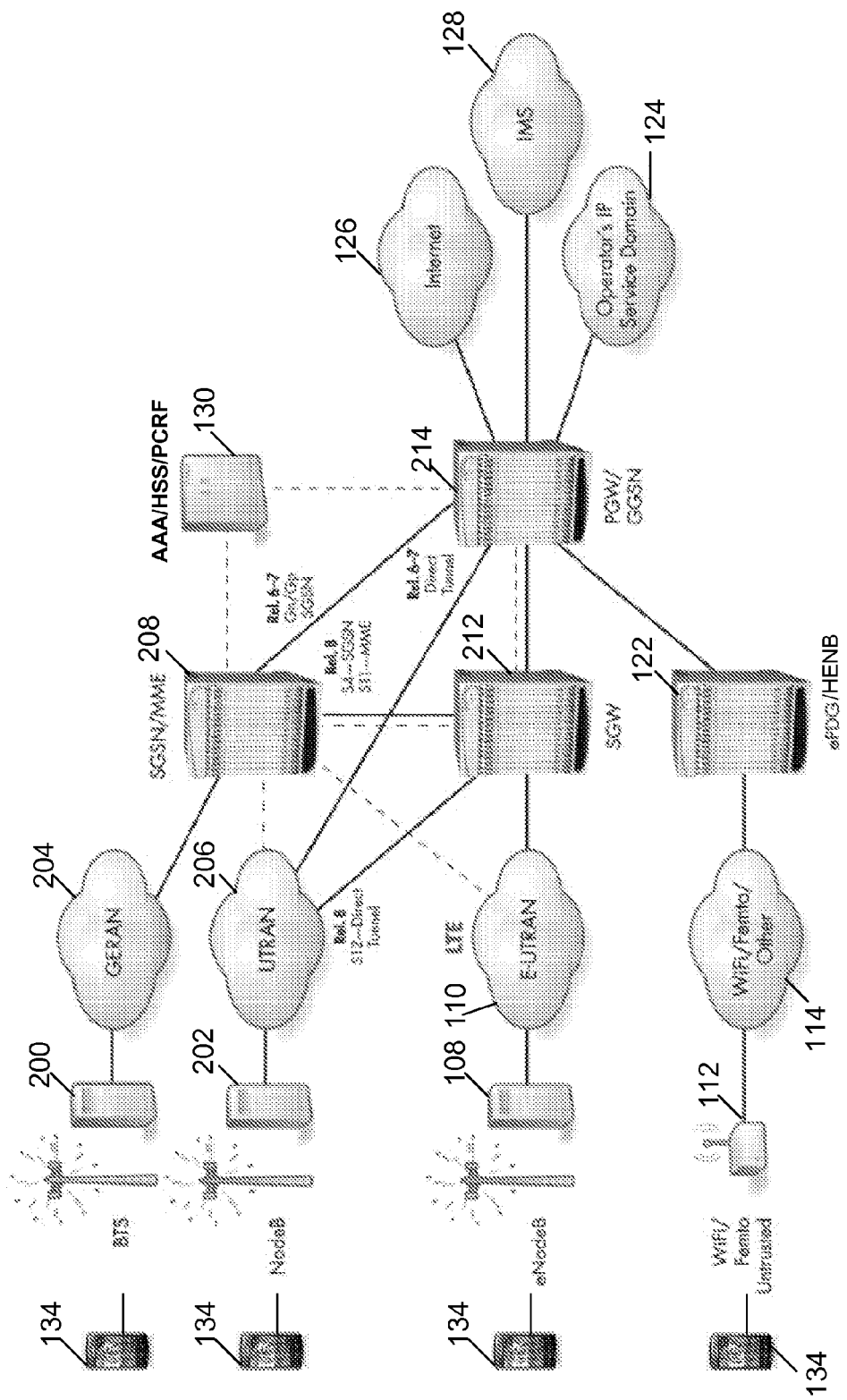
FIG. 2 illustrates a communication system for multiple-interface media protocol session management including universal mobile telecommunications systems (UMTS), LTE, and WiFi topologies in accordance with certain embodiments.

FIG. 2 illustrates a communication system for multiple-interface media protocol session management with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214. UEs 134 can receive data service via a trusted WLAN network.

Figure 3:
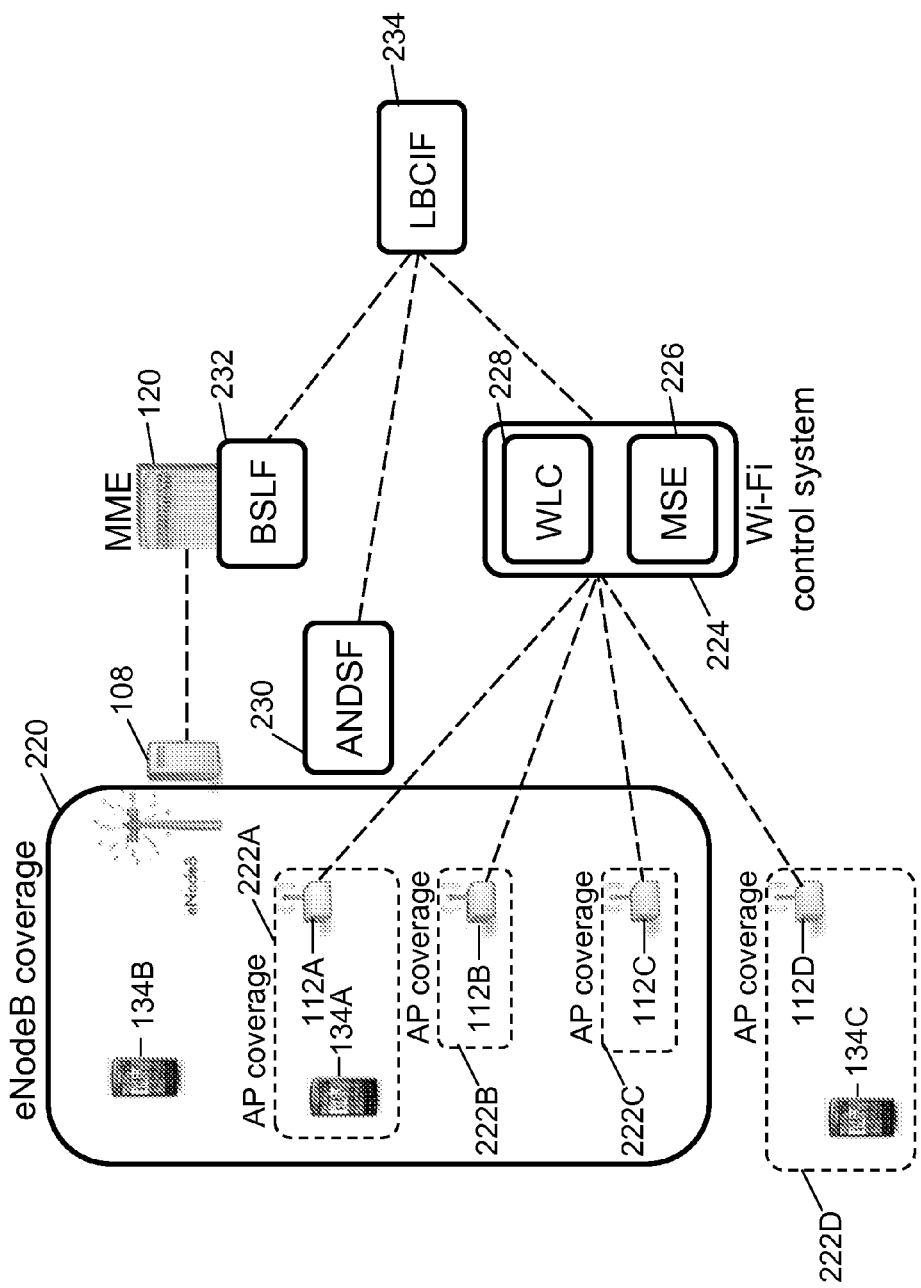
FIG. 3 shows a communication system with parallel networks in accordance with certain embodiments.

FIG. 3 shows a communication system with parallel networks in accordance with certain embodiments. FIG. 3 has a plurality of UEs 134A-134C; a cellular network that includes a base station 108, for example, an evolved Node B (eNodeB) transceiver, a service area 220 of the base station 108, an enhanced MME 120, and a base station load function (BSLF) 232; a wireless local area network (WLAN) that includes a plurality of access points (APs) 112A-112D, service areas 222A-222D of the plurality of APs 112A-112D, a WLAN control system 224 that includes a WLAN controller 228 and a mobility services engine (MSE) 226; a central node called a location based congestion identification function (LBCIF) 234, which is configured to communicate with both the cellular network system and the WLAN system; and an access network discovery and selection function (ANDSF) 230 in an Evolved Packet Core (EPC).

The BSLF 232 can be a part of cellular network's mobility unit, for example, an MME 120. A cellular network is a radio network with multiple transceivers, where each transceiver provides communication to a localized service area called a cell. The cellular network can include LTE networks, HSPA+ networks, and UMTS networks, for example. The size of a cell can vary depending on the transceiver. A macro cell transceiver is typically used by service providers to provide coverage over about a five kilometer distance.

The ANDSF 230 is typically deployed as a stand-alone network device that is accessible by UE 134. The ANDSF 230 can be co-located with the LBCIF 234. In the case of a trusted WLAN, the WLC 228 is located in the WLAN access network. If the trusted WLAN is operated by the cellular network operator, the WLC 228 can also be located in an MME 120. The WLC 228 and the LBCIF 234 can communicate using a Simple Object Access Protocol (SOAP) or a Representational State Transfer (REST) protocol. Likewise, the BSLF 232 and the LBCIF 234 can communicate using the SOAP or the REST protocol, and the LBCIF 234 and the ANDSF 230 can communicate using the SOAP or the REST protocol.

The WLAN controller 228 can include a wireless LAN controller (WLC) 228. A WLC 228 can perform traditional roles of access points, such as association or authentication of wireless clients. APs 112A-112C, also called access points, can register themselves with the WLC 228 and tunnel management and data packets to the WLC 228, which then switches the packets between the user equipment and the wired portion of the network. WLC 228 can be in charge of the configuring the WLAN. WLC 228 can provide configuration information to the APs 112A-112C so that the APs 112A-112C can act as a wireless interface to the UEs 134.

The APs 112A-112C can be equipped with antennas that are configured to transmit and receive data. For example, the APs 112A-112C may transmit video or audio traffic and receive acknowledgements. In one embodiment, the APs 112A-112C can communicate in accordance with IEEE 802.11 standard, including for example, IEEE 802.11n and 802.11k. The APs 112A-112C may transfer video or other forms of high data rate traffic such as audio, or any other type of data traffic.

An ANDSF 230 is configured to assist UEs to discover non-3GPP networks such as WLAN, WiMax, Femto, or other spectrum access. To this end, the ANDSF 230 can be configured to provide, to a UE, policy information regarding routing, mobility and discovery. The policy information can include an inter-system mobility policy, which indicates network selection rules in case only one network is available, (e.g., cellular or WLAN), an inter-system routing policy, which indicates network selection rules in case more than one network is available (e.g., both cellular and WLAN), and discovery information that lists the networks that may be available to the UE and any candidate information about the networks. The ABR client or UEs can register with the ANDSF 230 to receive service from the ANDSF 230.

In certain embodiments, an AP 112 can broadcast its data load condition to UEs 134 (or all the UEs in the AP's service area) for use by the ABR client on the UE using a Quality of Service Basic Service Set (QBSS) load element. The QBSS load element is a part of beacon frames generated by APs and contains the data load information associated with the APs. The QBSS load element can include three parameters: station count, channel utilization, and available admission capacity. The station count can indicate the total number of UEs currently associated with an access point. The channel utilization rate can indicate the normalized value of the total channel utilization which gives the percentage of the time the channel is sensed to be busy using either the physical or virtual carrier sense mechanism of the access point. The available admission capacity can indicate the amount of time that can be used by explicit admission control. A user equipment can use the QBSS load element parameters to decide to which of the available access points to attach and which interface to send ABR Media Requests over.

The communication system in FIG. 3 has a cellular network and a WLAN operating in parallel. Each network can have a plurality of service areas. A service area is often served by a wireless interface, such as a base station 108 or an AP 112. For example, a cellular network can include multiple service areas, each service area served by a base station 108; a WLAN can include multiple service areas, each service area served by an AP 112. In certain embodiments, service areas in different networks can overlap. For example, in FIG. 3, the base station's service area 220 overlaps with the APs' service areas 222A-222C. If a UE 134A is in an area covered by both WLAN and a cellular network, then the ABR client on UE 134A can attach to one of the overlapping networks for network services.

In certain embodiments, the networks such as the cellular network and the WLAN are configured to collect their own network condition information. The network condition information can include information on the network configuration and the network usage. For example, the network condition information can include the data load information, which indicates the amount of data being handled by one or more of service areas in a network and/or the amount of additional data traffic that could be handled by one or more of service areas in a network. The network condition information can also include the geo-location of wireless interfaces in a network and a list of UEs currently served by one or more service areas in a network and, if available, the geographic position of the UEs. In certain embodiments, the network condition information associated with a cellular network can be collected by a BSLF 232 in a MME 120. In certain embodiments, the network condition information associated with a WLAN can be collected by the WLC 228 in the WLAN control system 224.

The cellular network and the WLAN can share the collected network condition information with a central node 234. The central node 234, in turn, can retrieve the data load information from the received network condition information, and deliver the retrieved data load information to UEs 134. There can be at least two ways to deliver the data load information to UEs 134: (1) via a WLC 228 using an enhanced 802.11k signaling or (2) via an ANDSF 230 using an IP signaling. For example, in the first option, the central node 234 can deliver the data load information to the WLC 228. In turn, the WLC 228 can deliver the data load information to the AP 112. The AP 112 can subsequently broadcast the data load information to the UEs in the AP's service area. In certain embodiments, the AP 112 can broadcast the information as an enhanced-Quality of Service Basic Service Set (e-QBSS) load element. In the second option, the central node 234 can deliver the relevant data load information to the ANDSF 230, and the ANDSF 230 can relay the data load information to the UE 134. These options allow the ABR client on UE 134 to receive the network data load information from at least the cellular network and the WLAN without disconnecting from the currently attached network.

In certain embodiments, the central node 234 can deliver only relevant portion of the data load information to UEs 134 for use by ABR client. For the ABR client on UE 134, the relevant data load information can include the data load information of wireless interfaces that are capable of serving the UE 134. To determine which wireless interfaces can serve the UE 134, also called candidate wireless interfaces, the central node 234 can analyze the location of wireless interfaces. For example, if a UE 134A is attached to an AP 112A, the central node 234 can identify the serving AP 112A as one of the candidate wireless interfaces. To find additional wireless interfaces that can also serve the UE 134, the central node 234 can use the location information of the serving AP 112A and the location information of other wireless interfaces. For example, if a particular wireless interface is physically proximate to the serving AP 112A so that the service are of a particular wireless interface includes that of the serving AP 112A, the central node 234 can identify the particular wireless interface as one of the candidate wireless interfaces. In some embodiments, if the service coverage of the particular wireless interface overlaps with that of the serving wireless interface, the central node 234 can identify that the particular wireless interface as one of the candidate wireless interfaces. The ABR client on UE 134 can also use other means to determine available network interfaces. For example, UE 134 can scan available network interfaces and pass this information on to the ABR client. If the UE ranges into a Femto network or becomes connected to an Ethernet network, for example, these interfaces can be made available to the application layer ABR client to manage an ABR stream.

The client on UE 134 can use data load information to determine to which interfaces to attach. The data load information can be received from any applicable source. It can be received from the central node, gateways, servers, radio access networks, mobility management entities, policy servers, or any other network device that includes data load information. The client on UE 134 can use the data load information to determine whether include additional interfaces on the client. For example, when downloading from the cellular network the UE 134 can range into an access point that is less loaded. The UE 134 can add an interface to the access point in conjunction to the existing cellular network interface. The ABR client on UE 134 can then request and receive media protocol fragments from multiple interfaces.

The ABR client on UE 134 can also develop its own statistics on the speed and reliability of the different interfaces independent of the load information. This interface performance information collected on the client can be used in determining how to source requests from the client. This development of statistics on the different interfaces can be implemented in one or more modules on the UE. The modules can turn the ABR client into a stateful function by collecting intelligence received externally and/or internally developed intelligence regarding interfaces. This intelligence can be used to select an interface out of one or more available interfaces on a per-request basis. The intelligence can cache or store parameters regarding each interface available to the ABR client. These parameters can include latency, bandwidth, cost of data transmission, error rates, availability of interface, requested data rates, measured data rates, typical loading of network, and time-based usage characteristics. The time-based usage characteristics include time index statistics such as latency, error rates, and data rates corresponding to particular times of day.

The intelligence can use a combination of aggregated historical performance and reliability characteristics of an interface along with current information regarding the interface to make connections. For example, the ABR can make a first interface selection and data rate based on prior performance and reliability characteristics of an interface. The fragment request and interface selection logic can then source fragment requests based on current performance and reliability information. In some embodiments, the intelligence module can use weighting factors to determine what interface to use on per-fragment request basis. The weighting factors can include cost of the interface, prior performance and reliability, current performance and reliability, and external load information. The selection algorithm can also provide stateful knowledge to the selection of data rates at the ABR client. This can be useful to start at a bit rate expected to work for an interface or to limit cost on an expensive interface.

The selection algorithm provides the ability to enhance performance by using the varying characteristics across multiple interfaces. For example, the ABR client can use the fastest and most reliable interface to request the next fragment when there is little time to retrieve a fragment and use a slower and less reliable interface to retrieve a fragment that is not yet needed. The ABR client can also reduce the cost of downloading video content on a tariffed interface by requesting a percentage of fragments from a slower and less reliable interface. If the UE has access to a heavily loaded WiFi connection and a cellular connection, the user can be afforded a higher quality experience at a better cost by utilizing both interfaces. In certain embodiments, the ABR client on UE 134 can also analyze additional information to decide to which interface to connect. For example, the client on UE 134 can use one or more of the following: the load condition associated with the wireless interfaces, the wireless signal strengths associated with the wireless interfaces, the prior mobility of the UE 134, the prior speed and reliability of existing interfaces, and a configuration status on the UE 134 indicating whether the UE 134 favors the cellular network or the WLAN.

In certain embodiments, the central node 234 can periodically deliver the data load information to UEs for use in the ABR clients. This way, ABR clients can effectively manage multiple interface connections from the application layer in substantially real-time. In other embodiments, the central node 234 can deliver the data load information in response to certain triggering events. For example, a central node 234 can analyze the received network condition information to determine if any of the service areas in the parallel networks are congested or heavily utilized. If one of the service areas is congested or heavily utilized, the central node 234 can identify the UEs currently served by the congested service area and the wireless interfaces that can also serve the congested service area. Subsequently, the central node 234 can send, to the identified UEs 134, the data load information associated with the identified wireless interfaces. This way, the identified ABR clients on the UEs can attempt to add additional interfaces to improve the streaming delivery to the ABR client on UE 134.

Figure 4A:
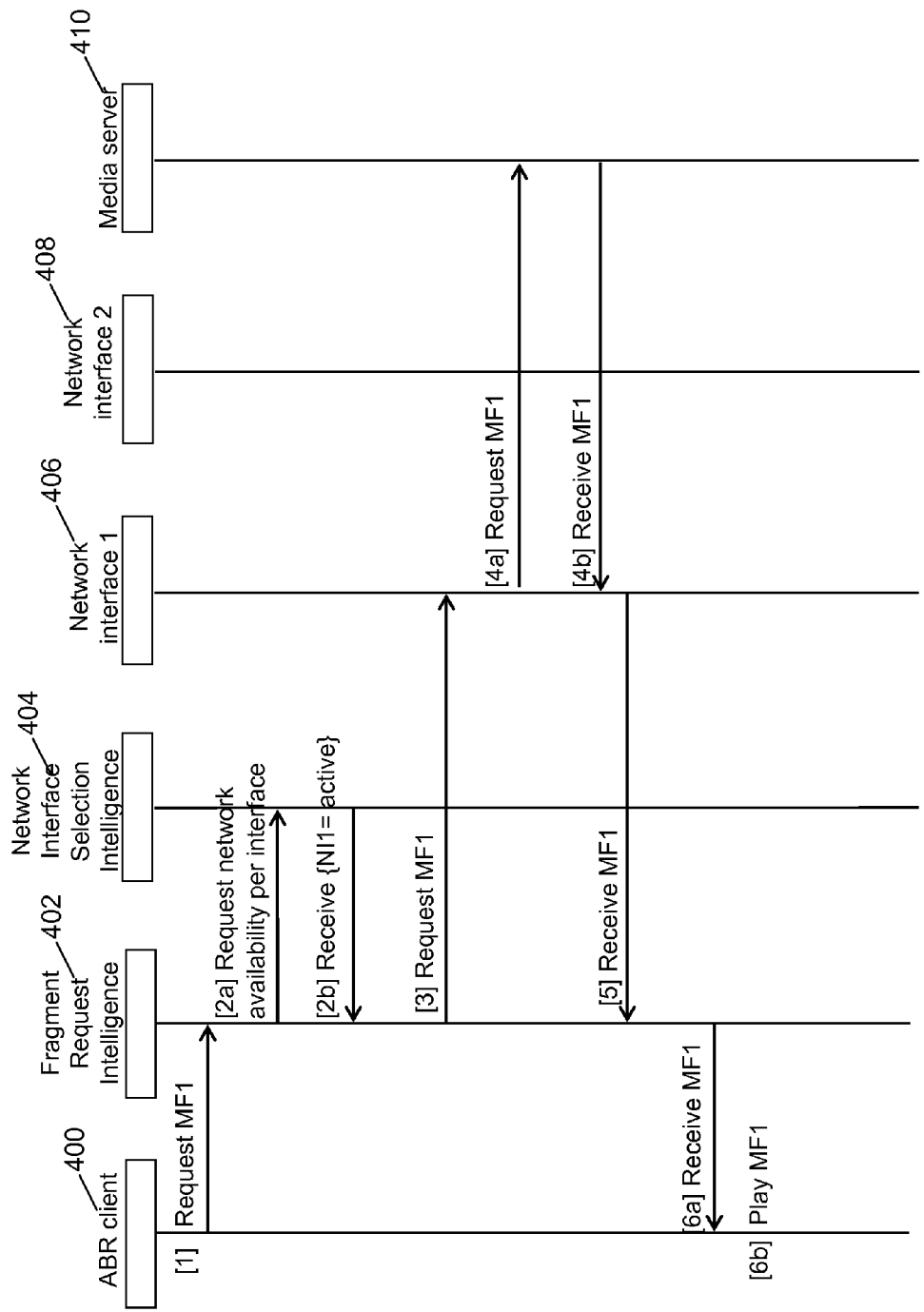
FIGS. 4A-4B illustrate flow diagrams for multiple-interface media protocol session management using a first network and a newly active second network in accordance with certain embodiments.
Figure 4B:
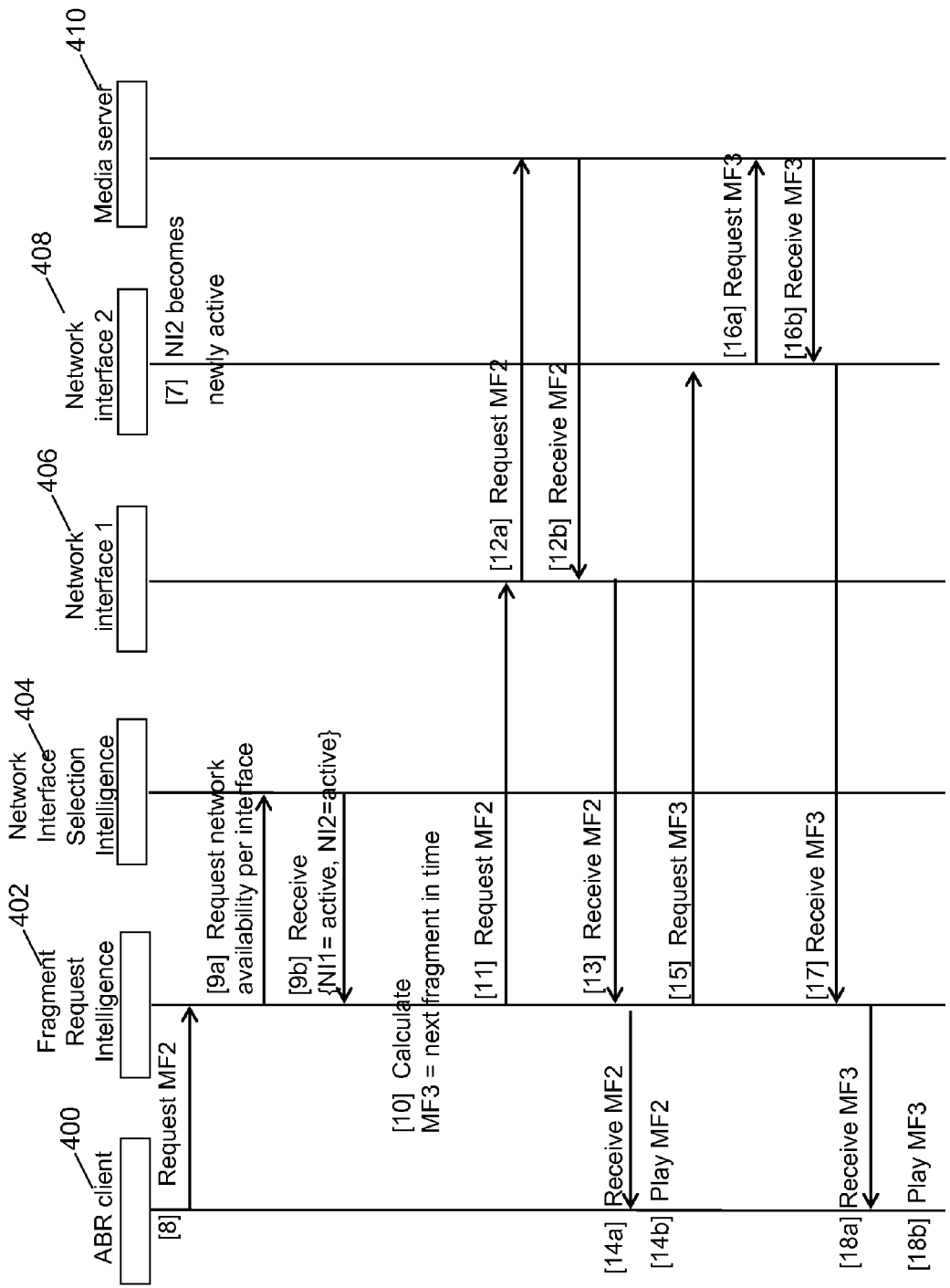

FIGS. 4A-4B illustrate signaling flow diagrams for multiple-interface media protocol session management using a first network and a newly active second network in accordance with certain embodiments. FIGS. 4A-4B include an ABR client 400, a Fragment Request Intelligence 402, Network Interface Selection Intelligence 404, a first network interface 406, a second network interface 408, and a media server 410. The ABR client 400 can include the Fragment Request Intelligence 402 and Network Interface Selection Intelligence 404 in a single module in some embodiments, and in other embodiments the modules can be separated. FIG. 4A illustrates a scenario in which an ABR client requests a media fragment from a first network. In step 1, the ABR client sends a request for a first media fragment (MF1) to the Fragment Request Intelligence 402. In step 2*a*, the Fragment Request Intelligence 402 requests network load information, such as the availability of each network interface accessible by the ABR client, from the Network Interface Selection Intelligence 404. In step 2b, the Fragment Request Intelligence 402 receives information regarding the network load. For example, the Fragment Request Intelligence 402 may receive {NI1=active}, representing the status that a single network interface is active. The network interface NI1 406 may be in communication with a 3G cellular network.

In step 3, the Fragment Request Intelligence 402 uses the network load information to determine a network interface over which to send the media fragment request. As described above, the Fragment Request Intelligence can receive network load information from the network (e.g., the central node) and the user equipment can maintain interface performance information. The Fragment Request Intelligence 402 uses the network load information that network interface NI1 is active to send a request for media fragment MF1 over network interface NI1. In step 4a, the network interface NI1 406 creates a session and sends the request for media fragment MF1 to the media server 410.

In step 4b, the network interface NI1 406 receives the requested media fragment MF1 from the media server 410. In step 5, the Fragment Request Intelligence 402 receives the requested media fragment MF1 from the network interface NI1 406. In step 6a, the ABR client 400 receives the requested media fragment MF1 from the Fragment Request Intelligence 402. In step 6b, the ABR client 400 plays the requested media fragment MF1.

FIG. 4B illustrates a scenario in which an ABR client requests media fragments from a newly active second network. With reference to FIG. 4A, in step 7 of FIG. 4B, the second network interface NI2 408 becomes active, meaning that data can be transferred over the second network. For example, the second network may be a WLAN. In step 8, the ABR client 400 requests a second media fragment (MF2) using the Fragment Request Intelligence 402. In step 9a, the Fragment Request Intelligence 402 requests network load parameters such as the availability of each network interface. As described above, the Fragment Request Intelligence can receive network load parameters from the network (e.g., the central node) and the user equipment can maintain interface performance information. In step 9b, the Fragment Request Intelligence 402 receives a list of available network interfaces. For example, the Fragment Request Intelligence 402 receives the list {NI1=active, NI2=active}.

In step 10, the Fragment Request Intelligence 402 determines a third media fragment (MF3) to request. The Fragment Request Intelligence 402 calculates the current play-out timeline of the second media fragment MF2, and determines the media fragment (here MF3) next in time after the current play-out timeline. As described above, the Fragment Request Intelligence 402 determines the media fragment MF3 according to the current play-out timeline of the current media fragment MF2. The Fragment Request Intelligence 402 requests media fragments correlating to the current play-out timeline to sustain contiguous rendering and playback of the requested media. For example, the Fragment Request Intelligence 402 may use the second network interface (NI2) 408 to request media fragments corresponding to the next media fragments due to play in sequence. As shown in FIG. 4B, the Fragment Request Intelligence 402 may manage both sessions using the ABR protocol to provide a common rendering of the requested media. Alternatively, the Fragment Request Intelligence 402 may terminate the first session and continue playback using data received from the second session. In further embodiments, the Fragment Request Intelligence 402 establishes additional sessions using a plurality of additional network interfaces. For example, the ABR client may have a newly active connection using a third network interface such as an Ethernet wired connection.

In step 11, the Fragment Request Intelligence 402 establishes a first session to receive data, and requests media fragment MF2 over the first network interface 406. In step 12a, the first network interface NI1 406 requests the media fragment MF2 from the media server 410. In step 12b, the first network interface NI1 406 receives the requested media fragment MF2 from the media server 410. In step 13, the Fragment Request Intelligence 402 receives the requested media fragment MF2 from the first network interface NI1 406. In step 14a, the ABR client 400 receives the requested media fragment MF2, and in step 14b, the ABR client 400 plays the media fragment MF2.

In step 15, the Fragment Request Intelligence 402 creates a second session and requests the next media fragment MF3 using the newly active network interface NI2 408. In step 16a, the second network interface NI2 408 requests the media fragment from the media server 410. In step 16b, the second network interface NI2 408 receives the media fragment MF3 from the media server 410. In step 17, the Fragment Request Intelligence 402 receives the media fragment MF3 from the second network interface NI2 408. In step 18a, the ABR client 400 receives the media fragment MF3 from the Fragment Request Intelligence 402, and in step 18b, the ABR client 400 plays the media fragment MF3.

Figure 5:
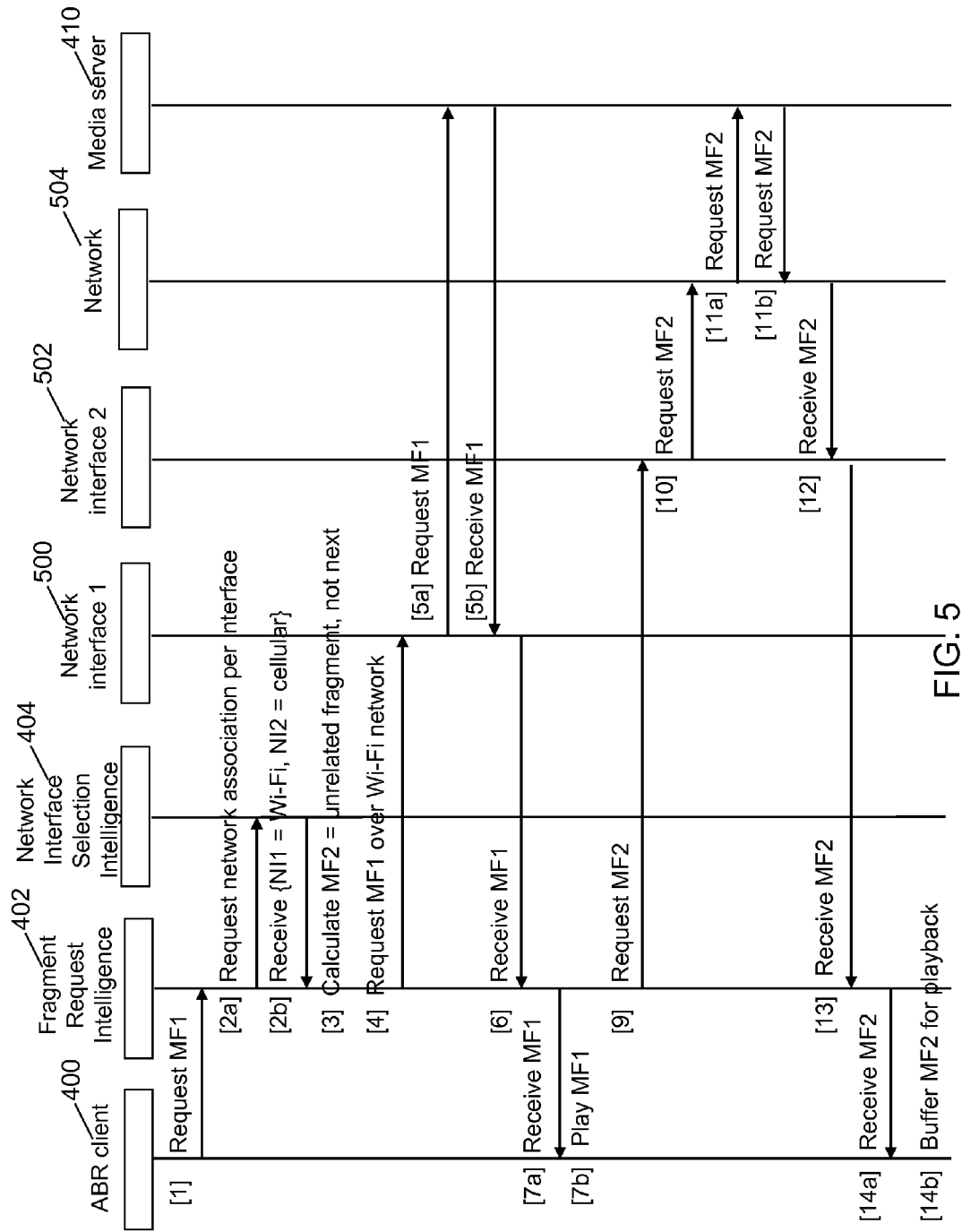
FIG. 5 illustrates a flow diagram for multiple-interface media protocol session management by a network operator over a faster and a slower network in accordance with certain embodiments.

FIG. 5 illustrates a signaling flow diagram for multiple-interface media protocol session management by a network operator over a faster and a slower network in accordance with certain embodiments. FIG. 5 includes the ABR client 400, the Fragment Request Intelligence 402, the Network Interface Selection Intelligence 404, a first network interface 500, a second network interface 502, a communications network 504, and the media server 410. The communications network 504 can be an LTE network, a WiFi network such as an 802.11n network, a WiMax network, or any other applicable network technology. In this embodiment, an ABR client on a UE 134 (shown in FIGS. 1-3) can prioritize offloading video session data traffic to a faster network interface, while retaining some analytics and control of a mobile device over a slower network interface. Similar to FIG. 4B, in step 1 of FIG. 5, the ABR client 400 requests a media fragment MF1 using the Fragment Request Intelligence 402. In step 2a, the Fragment Request Intelligence 402 requests network load parameters such as the network association of each network interface. As described above, the Fragment Request Intelligence can receive network load parameters from the network (e.g., the central node) and the user equipment can maintain interface performance information. In step 2b, the Fragment Request Intelligence 402 receives a list of network associations for each network interface. For example, the Fragment Request Intelligence 402 receives the list {NI1=Wi-Fi, NI2=cellular}. The first network interface NI1 500 is in communication with a WLAN over Wi-Fi, and the second network interface NI2 502 is in communication with a cellular network.

In step 3, the Fragment Request Intelligence 402 determines another media fragment MF2 to request. The Fragment Request Intelligence 402 requests an unrelated subset of fragments associated with the same media service as the media fragment MF1. These associated media fragment requests allow the network operator to carry out performance analysis, such as Deep Packet Inspection, on a similar fragment request. The network operator may use the performance analysis to gather metrics to compare session performance over differing networks.

Steps 4-9 of FIG. 5 are substantially similar to steps 11-15 of FIG. 4B and reference is made to FIG. 4B for those steps. In step 10, the second network interface NI2 502 requests the media fragment MF2 over the communications network 504. In step 11a, the media server 410 receives the request for media fragment MF2 over the communications network 504. In step 11b, the media server 410 sends the media fragment MF2 over the communications network 504. In step 12, the second network interface NI2 502 receives the media fragment MF2. As described above, the network operator is able to carry out performance analysis on the communications network 504 by comparing the two media fragment requests.

Steps 13-14a of FIG. 5 are substantially similar to steps 17-18a of FIG. 4B and reference is made to FIG. 4B for those steps. In step 14b, the ABR client 400 receives media fragment MF2 from the Fragment Request Intelligence 402. Because the media fragment MF2 is part of an unrelated subset of fragments relating to the same media service, the ABR client 400 buffers the media fragment MF2 for playback. As described with reference to FIG. 4B, if the media fragment MF2 had been the next media fragment in sequence according to the current play-out timeline of the requested media fragment MF1, the ABR client 400 could play the media fragment MF2 directly.

Figure 6:
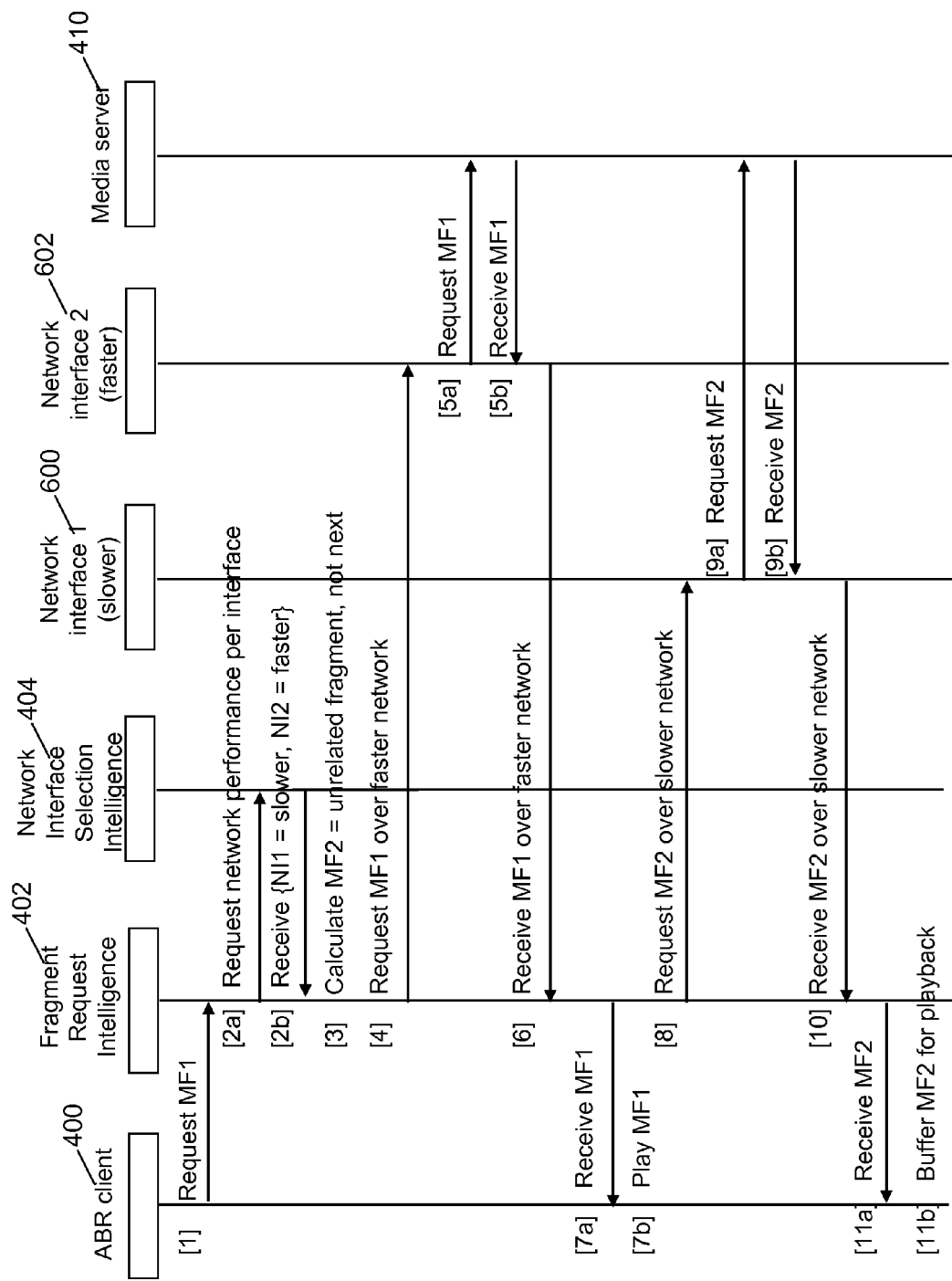
FIG. 6 illustrates a flow diagram for multiple-interface media protocol session management by pipelining fragment requests over a faster and a slower network in accordance with certain embodiments.

FIG. 6 illustrates a flow diagram for multiple-interface media protocol session management by pipelining fragment requests over a faster and a slower network in accordance with certain embodiments. FIG. 6 includes the ABR client 400, the Fragment Request Intelligence 402, the Network Interface Selection Intelligence 404, a first network interface 600, a second network interface 602, and the media server 410. Step 1 of FIG. 6 is substantially similar to step 1 of FIG. 5. In step 2a, the Fragment Request Intelligence 402 requests network load parameters such as the network performance of each network interface. As described above, the Fragment Request Intelligence can receive network load parameters from the network (e.g., the central node) and the user equipment can maintain interface performance information. In step 2b, the Fragment Request Intelligence 402 receives network performance characteristics for each network interface. For example, from these performance characteristics, the Fragment Request Intelligence 402 may determine the interface list {NI1=slower, NI2=faster}. The slower network may be a 3G cellular network and the faster network may be a Long Term Evolution (LTE) network. Other parameters can also be used in the interface selections by the ABR client. These other parameters include subscriber profile information and subscriber settings on the UE.

In step 3, the Fragment Request Intelligence 402 determines another media fragment MF2 to request. The Fragment Request Intelligence 402 determines an unrelated subset of fragments associated with the same media service as the media fragment MF1. The ABR client can receive the arbitrary media fragments slowly, but simultaneously, to media fragments that are next to be requested over the faster network interface.

In step 4, the Fragment Request Intelligence 402 requests the media fragment MF1 over the faster network interface 600. The Fragment Request Intelligence 402 is able to request further important media fragments, such as media fragments that are next to be played according to the current play-out timeline in the ABR client 400, using the faster network interface 600. The Fragment Request Intelligence 402 requests arbitrary media fragments that are not next, allowing the arbitrary media fragments to trickle to the ABR client 400 using the slower network interface 602. Steps 5a-7b of FIG. 6 are substantially similar to steps 16a-18b of FIG. 4B and reference is made to FIG. 4B for those steps. Steps 8-11a of FIG. 6 are substantially similar to steps 11-14a of FIG. 4B. Step 11b of FIG. 6 is substantially similar to step 14b of FIG. 5 and reference is made to FIG. 5 for those steps.

Figure 7:
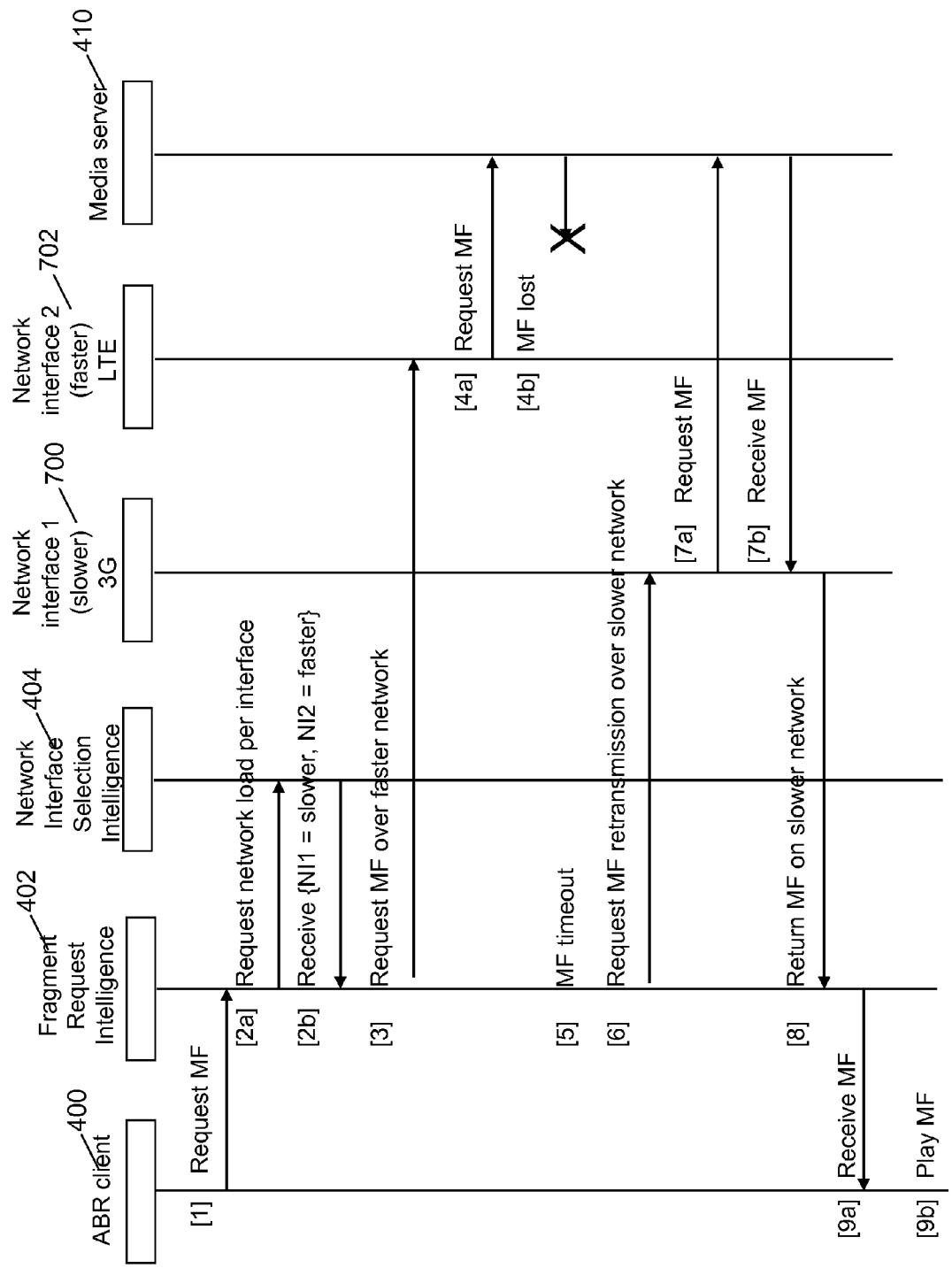
FIG. 7 illustrates a flow diagram for multiple-interface media protocol session management using a slower network interface for media fragment retransmissions in accordance with certain embodiments.

FIG. 7 illustrates a flow diagram for multiple-interface media protocol session management using a slower network interface for media fragment retransmissions in accordance with certain embodiments. FIG. 7 includes the ABR client 400, the Fragment Request Intelligence 402, the Network Interface Selection Intelligence 404, a first network interface 700, a second network interface 702, and the media server 410. Steps 1-2b of FIG. 7 are substantially similar to steps 1-2b of FIG. 6.

In step 3, the Fragment Request Intelligence 402 requests a media fragment MF over the faster network interface 702. In step 4a, the faster network interface 702 requests the media fragment MF from the media server 410. In step 4b, the media fragment MF is lost. The media fragment may be lost due to network conditions, or if the media server 410 is unable to process the media fragment request in enough time. In step 5, the Fragment Request Intelligence 402 times out waiting for the media fragment MF.

In step 6, the Fragment Request Intelligence 402 requests the media fragment MF over the slower network interface 702. Re-requesting the media fragment MF over the slower network interface 702 allows packet retransmission to happen "out-of-band" relative to the faster network interface 700. Accordingly, the Fragment Request Intelligence 402 can preserve the bandwidth and performance of the faster network interface 700 to allow the faster network interface 700 to transport new media fragments. Steps 7a-9a of FIG. 7 are substantially similar to steps 5a-7b of FIG. 5 and reference is made to FIG. 5 for those steps.

Figure 8:
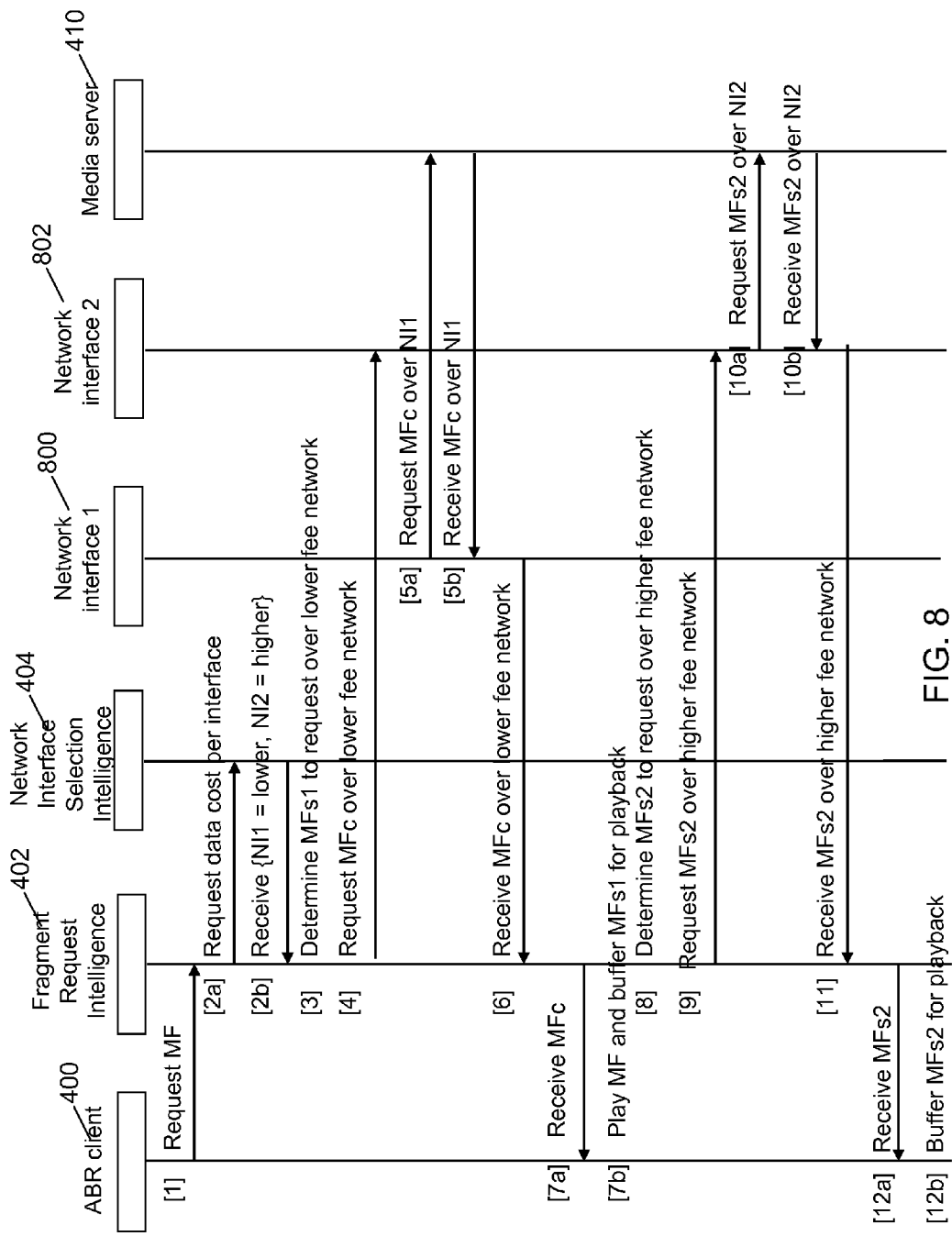
FIG. 8 illustrates multiple-interface media protocol session management for minimizing subscriber fees using a faster network interface and a slower network interface in accordance with certain embodiments.

FIG. 8 illustrates multiple-interface media protocol session management for minimizing subscriber fees using a faster network interface and a slower network interface in accordance with certain embodiments. FIG. 8 includes the ABR client 400, the Fragment Request Intelligence 402, the Network Interface Selection Intelligence 404, a first network interface 800, a second network interface 802, and the media server 410. Step 1 of FIG. 8 is substantially similar to step 1 of FIG. 7. In step 2a, the Fragment Request Intelligence 402 requests network load parameters such as the network performance of each network interface. As described above, the Fragment Request Intelligence can receive network load parameters from the network (e.g., the central node) and the user equipment can maintain interface performance information. In step 2b, the Fragment Request Intelligence 402 receives network cost characteristics for each network interface. For example, from these cost characteristics, the Fragment Request Intelligence 402 determines the interface list {NI1=lower usage fees, NI2=higher usage fees}. The slower network may be an untariffed 3G cellular network, and the faster network may be a tariffed Long Term Evolution (LTE) cellular network.

In step 3, the Fragment Request Intelligence 402 determines an additional set of media fragments MFs1 to request in addition to the requested media fragment MF. In particular, the Fragment Request Intelligence 402 may request a larger number of media fragments over the network interface 800 with lower usage fees, to avoid higher usage fees potentially associated with the faster network, such as usage fees with many high-speed macro-cellular networks. The Fragment Request Intelligence 402 can add the requested media fragment MF to a first set of media fragments (MFs1) to create a complete requested set of media fragments (MFc).

In step 4, the Fragment Request Intelligence 402 requests the complete set of media fragments MFc using the lower-usage-fee network interface 800. Steps 5a-7a of FIG. 8 are substantially similar to steps 7a-9a of FIG. 7. In step 7b, the ABR client 400 plays the requested media fragment MF from the complete requested set of media fragments MFc. The ABR client 400 also buffers the other media fragments from the complete requested set of media fragments MFc for playback. Because the Fragment Request Intelligence 402 sent this media fragment request using the lower-usage-fee network interface 800, the fees charged to the subscriber are reduced compared to if the Fragment Request Intelligence 402 had simply sent the media fragment request over the fastest available network interface.

In step 8, the Fragment Request Intelligence 402 determines a second set of media fragments (MFs2) to request. In particular, the Fragment Request Intelligence 402 may determine the set of media fragments MFs2 to request over the higher-usage-fee network interface 802 by requesting media fragments sufficient to allow seamless continuity for the ABR client 400 to play back the media stream.

In step 9, the Fragment Request Intelligence 402 requests the second set of media fragments MFs2 over the higher-usage-fee network interface 802. In step 10a, the higher-usage-fee network interface 802 requests the second set of media fragments MFs2 from the media server 410. In step 10b, the higher-usage-fee network interface 802 receives the second set of media fragments from the media server 410. In step 11, the Fragment Request Intelligence 402 receives the second set of media fragments MFs2 from the higher-usage-fee network interface 802. In step 12a, the ABR client 400 receives the additional set of media fragments MFs2, and in step 12b, the ABR client 400 buffers the media fragments in the second set of media fragments MFs2 for playback.

Figure 9:
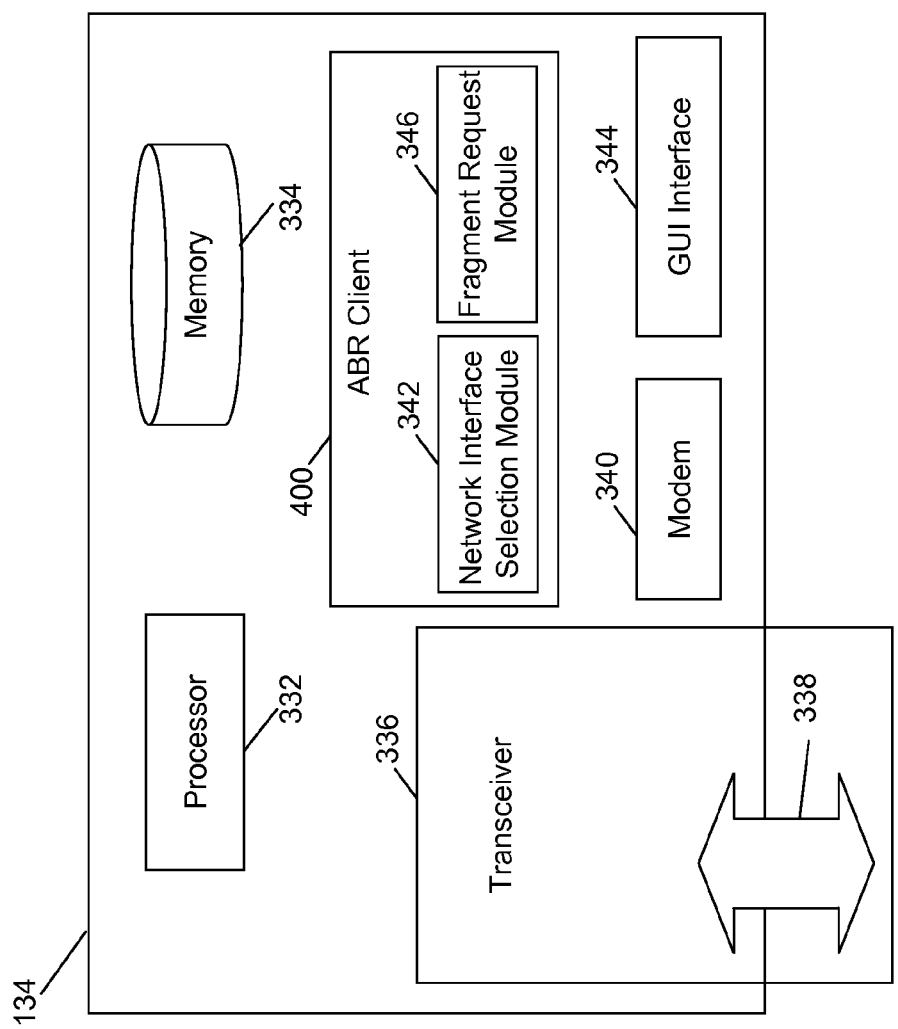
FIG. 9 illustrates a logical view of a user equipment in accordance with certain embodiments.

FIG. 9 illustrates a logical view of user equipment (UE) 134 in accordance with certain embodiments. The UE 134 can include a processor 332, a memory 334, a transceiver 336 including an interface 338, a modem 340, an ABR client 400 with a network interface selection module 342 and fragment request module 346, and a GUI interface 344.

The transceiver 336 includes a transmitter and a receiver. The transmitter and the receiver can be integrated into a single chip or can be embodied in separate chips. The transceiver 336 can also include an interface 338 that provides an input and/or output mechanism to communicate with other network devices. The interface 338 can measure the wireless signal strengths of wireless interfaces such as base stations and access points. The interface 338 can be implemented in hardware to send and receive signals in a variety of mediums, such as optical, copper, and wireless, and in a number of different protocols some of which may be non-transient.

The modem 340 is configured to implement modulation and framing of signals according to one or more communication standards. The communication standards include WLAN related standards such as 802.11 and its addenda, and the cellular standards defined under 3GPP.

The ABR client 400 is configured to process media fragments in accordance with media protocols, as described above. The ABR client can include intelligence that determines how and when to use the various interfaces that are exposed to the application layer ABR client. The client leverages the stateless operation of the media fragment requests to aggregate data from multiple interfaces to provide a unified video rendering experience on the user equipment. The fragments may or may not be derived from the same unique http session. The client also has the capability to simulate requests over multiple interfaces for the purpose of evaluating performance and establishing secondary sessions for delivery of associated fragments. The ABR client includes intelligence to gather parameters regarding the performance of each interface using various metrics such as latency, bandwidth, error rate, and availability as well as other parameters regarding subscriber preferences such use of different interface options, quality of service, bandwidth caps on certain interfaces, and acceptable error rates.

The ABR client can use rules that determine how and when to use the different interfaces. The rules provide various embodiments of operation that can be used together or separately and are described in conjunction with FIGS. 4A-8. The rules at the client, for example, can prioritize offloading to a WiFi network when the WiFi network is available and meets certain performance parameters. The rules in the ABR client can be multi-tiered to provide the experience desired by the subscriber. For example, WiFi can be preferred for cost reasons, but not if the WiFi connection is poor performance. The rules can also provide blended solutions offloading a portion to WiFi and only using LTE to obtain dropped requests or to supplement the data rate. A blended multi-interface rendering can use WiFi for 70 percent of the requests and delivery, while using a cellular connection for 30 percent of the requests. This can provide the user potentially with a better experience than could be obtained with a cellular only interface or a WiFi only interface.

The ABR client being in the application layer can also prompt the user through the GUI 344 whether the user wants to use cellular for a certain percentage. As such, the rules present in the ABR client can include subscriber input in the decision making. The ABR client can also keep track data usage on fee-incurring interfaces and ration usage of particular interfaces based on how close the subscriber is to a incurring additional fees. An algorithm can also be used that weighs the cost per data unit (e.g., megabyte) of the different interfaces with a cost that is acceptable to the subscriber. The cost that is acceptable to the subscriber can be calculated in some embodiments based on other metrics and historical information known about the subscriber.

The fragment request module 346 is configured to communicate with the network interface selection module 342 to select media fragments to request from media servers 410 (shown in FIGS. 4A-8). The fragment request module 346 can include the intelligence and rules of the ABR client in some embodiments. This intelligence and rules can be used to determine which interface to send the ABR fragment request over. The network interface selection module 342 is configured to select a network interface from which to receive network services. In some embodiments, the network interface selection module 342 makes the selection based on the determination in the fragment request module 346. In other embodiments, the network interface selection module 342 includes the intelligence and rules of the ABR client and tracks ABR fragment requests. The network interfaces can include interfaces to different types of communication networks, including cellular networks, WLANs, Ethernet, Femto, and unlicensed spectrum. Cellular networks can include LTE networks. A wireless interface for LTE networks can include a base station such as an eNodeB; a wireless interface for WLANs can include an access point.

The network interface selection module 342 can select the serving wireless interface by analyzing data load information associated with wireless interfaces. In certain embodiments, the network interface selection module 342 can be configured to attach to a wireless interface handling the least amount of data traffic and/or with more available resources. In certain embodiments, the network interface selection module 342 can also analyze additional information to decide to which wireless interface to connect. For example, the network interface selection module 342 can use one or more of the following: the load condition associated with the candidate wireless interfaces, the wireless signal strength associated with the candidate wireless interfaces, and a configuration status or subscriber profile information on the wireless interface selection module 342 indicating whether the subscriber has preferences in managing ABR content delivery over multiple interfaces.

The ABR client 400, fragment request module 346, and/or network interface selection module 342 can be implemented in software using memory 304 such as a non-transitory computer readable medium, a programmable read only memory (PROM), or flash memory. The software can run on a processor 302 that executes instructions or computer code. The ABR client 400, fragment request module 346, and/or network interface selection module 342 may also be implemented in hardware using an application specific integrated circuit (ASIC), programmable logic array (PLA), or any other integrated circuit.

The GUI interface 344 can provide communication with an input and/or output mechanism to communicate with UE users. UE users can use input/output devices to send/receive data to/from the UE 134 over the GUI interface 344. Input/output devices can include, but are not limited to, a keyboard, a screen, a touch screen, a monitor, and a mouse. The GUI interface 344 can operate under a number of different protocols, and the GUI interface 344 can be implemented in hardware to send and receive signals in a variety of mediums, such as optical, copper, and wireless.

User Equipment

The UE 134 described above can communicate with a plurality of radio access networks using a plurality of access technologies and with wired communication networks. The UE 134 can be a smart phone offering advanced capabilities such as word processing, web browsing, gaming, e-book capabilities, an operating system, and a full keyboard. The UE 134 may run an operating system such as Symbian OS, iPhone OS, RIM's Blackberry, Windows Mobile, Linux, Palm WebOS, and Android. The screen may be a touch screen that can be used to input data to the UE 134 and the screen can be used instead of the full keyboard. The UE 134 may have the capability to run applications or communicate with applications that are provided by servers in the communication network. The UE 134 can receive updates and other information from these applications on the network.

The UE 134 also encompasses many other devices such as televisions (TVs), video projectors, set-top boxes or set-top units, digital video recorders (DVR), computers, netbooks, laptops, and any other audio/visual equipment that can communicate with a network. The UE 134 can also keep global positioning coordinates, profile information, or other location information in its stack or memory. The UE 134 can have a memory such as a computer readable medium, flash memory, a magnetic disk drive, an optical drive, a programmable read-only memory (PROM), and/or a read-only memory (ROM). The UE 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 134 can also provide a variety of user interfaces such as a keyboard, a touch screen, a trackball, a touch pad, and/or a mouse. The UE 134 may also include speakers and a display device in some embodiments.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the ABR client can be a client of a different media protocol.

We claim:

1. An apparatus comprising:
  a first interface to communicate with a first communication network;
  a second interface to communicate with a second communication network;
  a processor to:
    send, through the first interface, a first set of one or more adaptive bitrate (ABR) requests for one or more fragments of a multimedia file;
    determine a playback time of the one or more fragments of the multimedia file;
    form a second set of one or more ABR requests for one or more fragments of the multimedia file based on the determined playback time; and
    send, through the second interface, the second set of one or more ABR requests.

2. The apparatus of claim 1, further comprising a memory to store performance information associated with at least one of the first interface or the second interface.

3. The apparatus of claim 2, wherein at least one of the first set or the second set of ABR requests is formed based on the performance information.

4. The apparatus of claim 3, wherein the performance information comprises a bandwidth associated with of at least one of the first interface or the second interface.

5. The apparatus of claim 3, wherein the performance information comprises a latency associated with of at least one of the first interface or the second interface.

6. The apparatus of claim 3, wherein the performance information comprises metrics associated with past ABR requests, the metrics tracked by the apparatus.

7. The apparatus of claim 1, further comprising:
  a memory to store subscriber preference information; and
  wherein at least one of the first set or the second set of ABR requests is formed based on the subscriber preference information.

8. The apparatus of claim 7, wherein the subscriber preference information indicates a preference for the first interface.

9. The apparatus of claim 7, wherein the subscriber preference information indicates a cost associated with at least one of the first interface or the second interface.

10. A method comprising:
  sending, through a first interface, a first set of one or more adaptive bitrate (ABR) requests for one or more fragments of a multimedia file;
  determining a playback time of the one or more fragments of the multimedia file;
  forming a second set of one or more ABR requests for one or more fragments of the multimedia file based on the determined playback time; and
  sending, through a second interface, the second set of one or more ABR requests.

11. The method of claim 10, further comprising storing performance information associated with at least one of the first interface or the second interface.

12. The method of claim 11, wherein at least one of the first set or the second set of ABR requests is formed based on the performance information.

13. The method of claim 12, wherein the performance information comprises a bandwidth associated with of at least one of the first interface or the second interface.

14. The method of claim 12, wherein the performance information comprises a latency associated with of at least one of the first interface or the second interface.

15. The method of claim 12, wherein the performance information comprises metrics associated with past ABR requests.

16. The method of claim 10, wherein at least one of the first set or the second set of ABR requests is formed based on subscriber preference information.

17. The method of claim 16, wherein the subscriber preference information indicates a preference for the first interface.

18. The method of claim 16, wherein the subscriber preference information indicates a cost associated with at least one of the first interface and the second interface.

19. At least one non-transitory medium comprising encoded logic that when executed is operable to:
    send, through a first interface, a first set of one or more adaptive bitrate (ABR) requests for one or more fragments of a multimedia file;
    determine a playback time of the one or more fragments of the multimedia file;
    form a second set of one or more ABR requests for one or more fragments of the multimedia file based on the determined playback time; and
    send, through a second interface, the second set of one or more ABR requests.

20. The medium of claim 19, wherein at least one of the first set or the second set of ABR requests is formed based on performance information associated with at least one of the first interface or the second interface.

\* \* \* \* \*